United States Patent [19]

Yoshino et al.

[11] Patent Number: 4,615,846

[45] Date of Patent: Oct. 7, 1986

[54] METHOD OF MANUFACTURING A LOW-MELTING POINT ALLOY FOR SEALING IN A FLUORESCENT LAMP

[75] Inventors: Hisashi Yoshino, Yokohama; Masakatsu Haga, Tokyo; Takashi Yorifuji, Zushi; Teruo Oshima, Yokohama, all of Japan

[73] Assignee: Kabushiki Kaisha Toshiba, Kawasaki, Japan

[21] Appl. No.: 651,682

[22] Filed: Sep. 18, 1984

[30] Foreign Application Priority Data

| | | | |
|---|---|---|---|
| Sep. 30, 1983 | [JP] | Japan | 58-180531 |
| Sep. 30, 1983 | [JP] | Japan | 58-180532 |
| Sep. 30, 1983 | [JP] | Japan | 58-180533 |

[51] Int. Cl.$^{4}$ ........................... B01J 2/06; B28B 3/20; H01J 61/26

[52] U.S. Cl. ........................................ 264/13; 264/14; 264/178 F; 264/180; 264/176.2; 313/490

[58] Field of Search ........... 264/13, 14, 176 F, 176 R, 264/178 R, 178 F, 180; 313/490

[56] References Cited

U.S. PATENT DOCUMENTS

| | | | |
|---|---|---|---|
| 2,738,548 | 3/1956 | Kassel | 264/14 |
| 2,919,471 | 1/1960 | Hechinger | 264/13 |
| 3,152,278 | 10/1964 | Dziergwa et al. | 313/490 X |
| 3,845,805 | 11/1974 | Kavesh | 264/180 |
| 3,862,658 | 1/1975 | Bedell | 264/176 F X |
| 3,890,531 | 6/1975 | Panofski et al. | 313/490 |
| 4,015,162 | 3/1977 | Evans et al. | 313/490 |
| 4,157,485 | 6/1979 | Wesselink et al. | 313/490 X |
| 4,380,518 | 4/1983 | Wydro, Sr. | 264/13 |
| 4,405,535 | 9/1983 | Raman et al. | 264/13 X |
| 4,410,829 | 10/1983 | Anderson et al. | 313/490 |

FOREIGN PATENT DOCUMENTS

| | | |
|---|---|---|
| 54-85120 | 7/1979 | Japan . |
| 54-33215 | 10/1979 | Japan . |
| 56-22921 | 5/1981 | Japan . |

*Primary Examiner*—Robert Yoncoskie
*Attorney, Agent, or Firm*—Oblon, Fisher, Spivak, McClelland & Maier

[57] ABSTRACT

A method of manufacturing an amalgam for sealing in a fluorescent lamp consisting of tin, lead, bismuth, indium and mercury is disclosed. In this method, the amalgam is first melted and then discharged through a nozzle to be contacted with a coolant. A fluorescent lamp containing the amalgam manufactured by the above method is also disclosed.

19 Claims, 5 Drawing Figures

METHOD OF MANUFACTURING A LOW-MELTING POINT ALLOY FOR SEALING IN A FLUORESCENT LAMP

BACKGROUND OF THE INVENTION (a) Field of the Invention

The present invention relates to a method of manufacturing a low melting-point alloy which is sealed in a fluorescent lamp, particularly, a low-pressure mercury vapor discharge lamp, so as to control the mercury vapor pressure therein, and to a fluorescent lamp having a low melting-point alloy manufactured by this method sealed therein.

(b) Description of the Prior Art

A low-pressure mercury discharge lamp such as a fluorescent lamp is known to have a highest efficiency of converting supplied electric energy into ultraviolet radiation of 253.7 nm wavelength when a mercury vapor pressure in a sealed tube is $6\times10^{-3}$ to $7\times10_{-3}$ mmHg and a discharge current is relatively low.

Since the ultraviolet radiation of 253.7 nm wavelength has a high fluorescent excitation efficiency, the mercury vapor pressure is preferably kept to fall within the above range of $6\times10^{-3}$ to $7\times10^{-3}$ mmHg and the temperature sealed tube wall at this time is preferably about 40° C. However, recently developed low-pressure mercury vapor discharge lamps such as fluorescent lamps have higher loads acting on the sealed tube wall due to a tendency toward a smaller tube diameter. For this reason, the temperature of the sealed tube wall is high and exceeds 100° C. in some cases.

When the sealed tube wall temperature becomes high, the mercury vapor pressure in the sealed tube exceeds $7\times10^{-3}$ mmHg. Then, ultraviolet radiation components mainly having a wavelength of 253.7 nm are self-absorbed by mercury. This impairs the conversion ratio of the supplied energy into ultraviolet radiation and lowers the light output.

As a countermeasure against this, amalgam is conventionally sealed in the sealed tube so as to suppress an increase in the mercury vapor pressure at high temperatures. Japanese Patent Publications Nos. 54-33215 and 54-38582 describe fluorescent lamps in which an amalgam consisting of Hg, In, and one metal selected from Li, Al, Zn, Sn, Pb and Bi; or an amalgam consisting of Hg, Bi, and Pb or of Hg, Bi, Pb, and Sn.

Such an amalgam is sealed in the sealed tube by measuring a predetermined amount discharged from a vacuum suction thin tube having an inner diameter of about 2.0 to 2.5 mm. Therefore, conventionally, the amalgam is formed into particles by the atomizing method of spraying the amalgam in a molten state with a gas or by a method of pulverizing and granulating an amalgam ingot and measuring and sealing a predetermined amount of amalgam particles and sealing the measured amalgam particles in a sealed tube.

However, amalgam particles obtained by the atomizing method have a nonuniform shape and size and must be sieved by a sieve of a predetermined size for size adjustment before measurement and sealing into a sealed tube. This results in a very low yield and an expensive method. With the method of pulverizing the ingot, the resultant particles similarly have a nonuniform particle size and shape and also have cracks. Furthermore, since the central portion of the ingot has a higher content of Hg than anywhere else, the composition of the particles varies, resulting in a variation in a suppression effect of mercury vapor pressure upon sealing in a sealed tube.

SUMMARY OF THE INVENTION

The present invention has been made in consideration of this and has as its object to provide a method of manufacturing a low melting-point alloy for sealing in a fluorescent lamp, which has a uniform composition, a particle size or wire diameter falling within predetermined ranges, and allows easy measurement and introduction through a thin tube, and a fluorescent lamp in which a low melting-point alloy prepared by this method is sealed.

According to the present invention, there is provided a method of forming a low melting-point alloy for sealing in a fluorescent lamp into a shape suitable for sealing in the fluorescent lamp, characterized by comprising the steps of melting the alloy; ejecting the molten alloy through a nozzle; and rapidly cooling the molten alloy ejected through said nozzle by bringing the molten alloy into contact with a coolant.

According to the present invention, there is also provided a fluorescent lamp in which a low melting-point alloy manufactured by the method as described above is sealed.

DESCRIPTION OF THE PREFERRED EMBODIMENTS

According to the present invention, by suitably selecting the ejecting conditions of a molten alloy from a nozzle and rapid cooling conditions, a sealing alloy in the form of particles of uniform diameter or a wire of uniform diameter may be formed.

Figure 1:
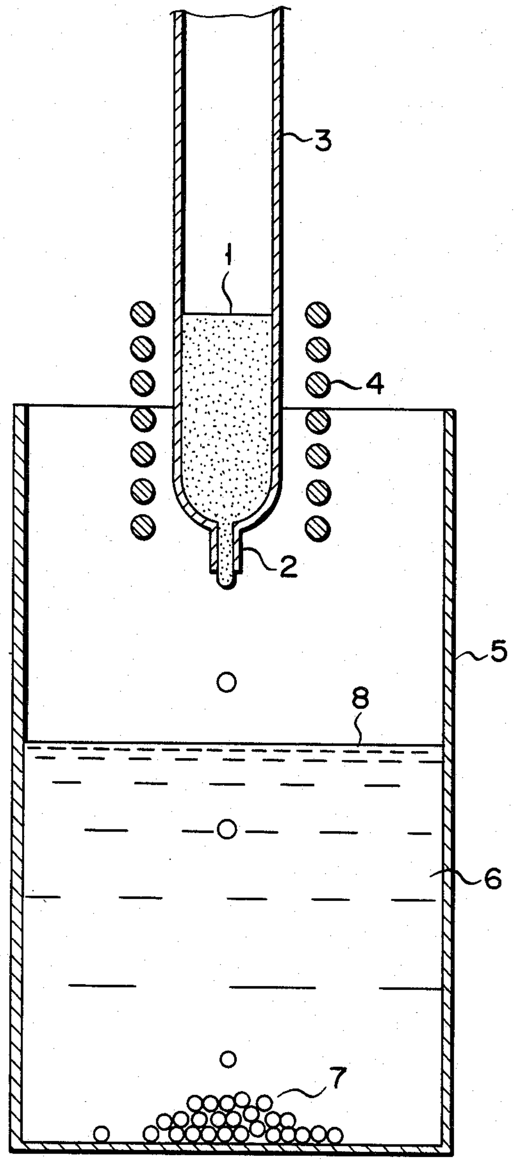
FIG. 1 is a schematic sectional view of an apparatus which is used in a method of the present invention.

FIG. 1 illustrates an apparatus for forming a sealing alloy into particles by a method according to the present invention.

A low melting-point alloy raw material 1 is charged in a container 3 having a nozzle 2 at its lower end. The container 3 consists of a high-melting point material which will not react with the alloy raw material 1, for example, quartz or stainless steel. A high-frequency coil or an electric heater 4 is arranged to surround the container 3 and heat the raw material 1 held therein. A coolant container 5 is arranged below the nozzle 2 and holds therein a coolant 6 having a high cooling effect, such as water, a colloidal solution or an oil.

The coolant 6 is preferably kept at a temperature ranging from room temperature to 80° C. Examples of the colloidal solution as the coolant 6 include an alumina colloidal solution and zirconia colloidal solution. Examples of the oil as the coolant 6 include silicone oil. The viscosity of such a coolant preferably should be as high as possible for example more than 1 poise in order to obtain as spherical particles as possible.

In the apparatus as described above, the alloy raw material 1 is first charged in the container 3 and is heated by the heater 4 to be melted. When the raw material 1 becomes molten and reaches a predetermined temperature, a gas is introduced into the container 3 from an inlet port at its upper portion so as to extrude the raw material 1 through the nozzle 2. The raw material 1 thus ejected from the nozzle 2 is sequentially dripped into the coolant 6 to be rapidly cooled thereby. Alloy particles 7 are thus prepared.

According to the present invention, the nozzle 2 preferably has an inner diameter of 0.15 to 1.0 mm and more preferably an inner diameter of 0.3 to 0.7 mm. When the inner diameter of the nozzle 2 is less than 0.15 mm, the extrusion resistance of the alloy becomes too great. However, when the inner diameter of the nozzle 2 exceeds 1.0 mm, the alloy droplets become too large, so that the resultant alloy particles 7 have diameters of 3 mm or more. Such large alloy particles cannot be inserted into a thin tube of the sealed tube.

The distance between the nozzle 2 and a coolant surface level 8 is suitably about 2 to 100 mm and preferably falls within the range of 5 to 30 mm. When this distance is below 2 mm, the molten alloy is brought into contact with the coolant 6 and cooled thereby before it is dropped as droplets from the tip of the nozzle 2. However, when this distance exceeds 100 mm, the droplets are flattened upon colliding against the coolant surface level 8 and spherical particles cannot be obtained.

The extrusion pressure of the molten alloy from the nozzle 2 preferably falls within the range of 0.005 to 0.2 $kg/cm^2$ and more preferably falls within the range of 0.05 to 0.1 $kg/cm^2$. When the extrusion pressure is below 0.005 $kg/cm^2$, stable and continuous extrusion of alloy cannot be performed. However, when the extrusion pressure exceeds 0.2 $kg/cm^2$, the alloy is continuously extruded and a wire is obtained in place of particles.

The alloy particles 7 thus obtained have a spherical shape of a diameter of about 1.5 to 2 mm. Furthermore, since these particles 7 are obtained by rapid cooling from the molten state, the particle composition is homogeneous. The thus obtained particles 7 are measured and inserted in a thin tube to be sealed in a sealed tube. Therefore, a conventional step of sieving the particles can be obviated, so that the method of the present invention is inexpensive and provides a better workability.

When a plurality of nozzles 2 are formed at the lower end of the container 3, a number of droplets of the molten alloy can be formed simultaneously, resulting in a still better workability.

Figure 2:
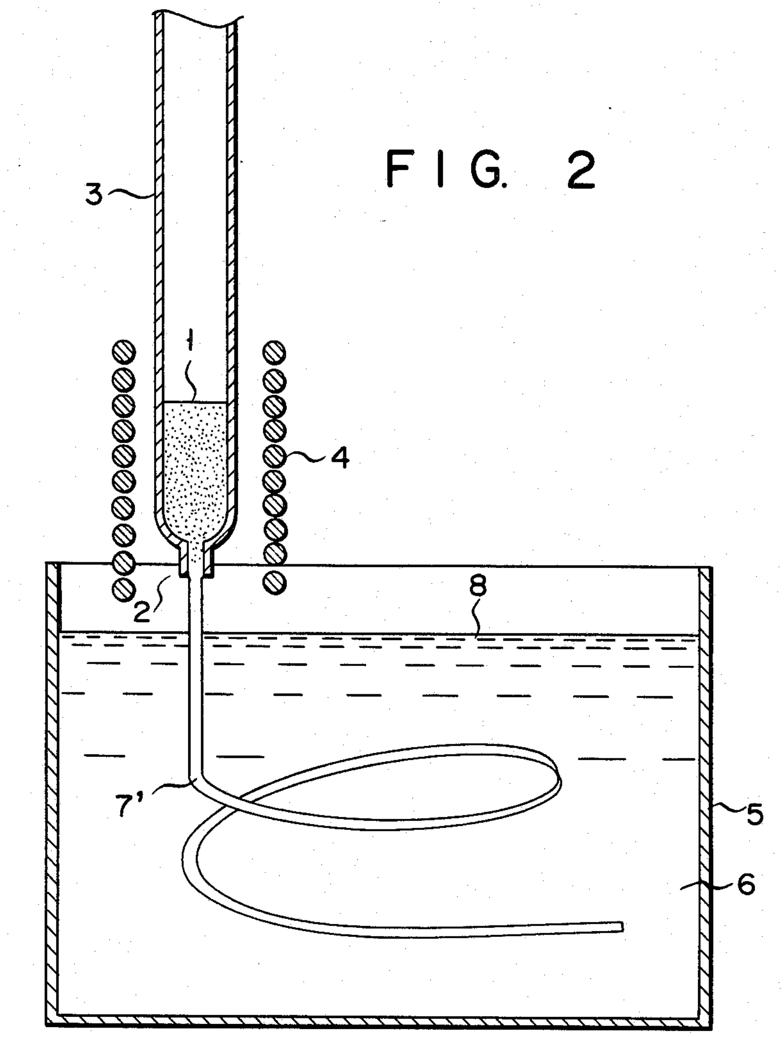
FIG. 2 is a schematic sectional view of another apparatus which is used in a method of the present invention.
Figure 3:
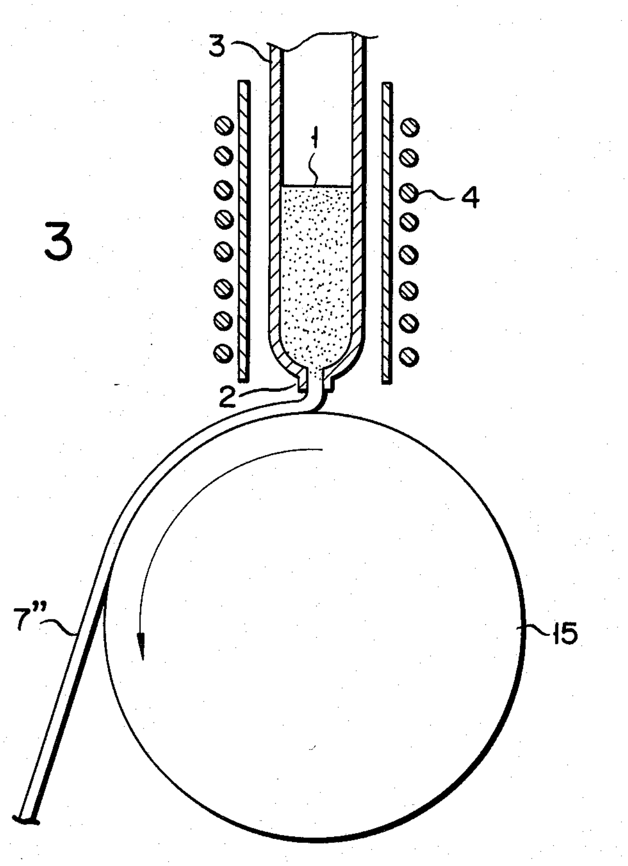
FIG. 3 is a schematic sectional view of still another apparatus which is used in a method of the present invention.

FIGS. 2 and 3 are for explaining other embodiments of the method of the present invention wherein a wire of a sealing alloy is obtained.

The method shown in FIG. 2 will first be described. As in the case of FIG. 1, a high-frequency coil or electric heater 4 is arranged to surround a container 3 which has a nozzle 2 at its lower end and holds a low melting-point alloy raw material 1 therein. A coolant container 5 holding a coolant 6 therein is arranged below the container 3, as in the case of FIG. 1. However, in FIG. 3, the coolant container 5 is supported on a rotating table (not shown) and is thereby rotated about an axis shifted from the nozzle 2.

In the apparatus shown in FIG. 2, the alloy raw material 1 is first charged into the container 3 and is heated to be melted by the electric heater 4. When the alloy raw material 1 becomes molten and reaches a predetermined temperature, a gas is introduced into the container 3 through an inlet port at an upper portion thereof at a pressure of 0.1 to 0.5 $kg/cm^2$. Thus, the raw material 1 is continuously ejected from the nozzle 2 into the coolant 6 to be rapidly cooled thereby. A continuous alloy wire 7' is thus obtained. In this case, when the coolant container 5 is rotated, the formed alloy wire 7' is sequentially formed into a loose coil.

The nozzle 2 preferably has an inner diameter of 0.3 to 2.0 mm. When the inner diameter of the nozzle 2 is less than 0.3 mm, a continuous alloy wire 7' cannot be obtained. However, when the inner diameter exceeds 2.0 mm, the wire diameter becomes nonuniform.

The distance between the nozzle 2 and a coolant surface level 8 of the coolant 6 in the container 5 is preferably 30 mm or less and is more preferably 2 to 10 mm. When this distance exceeds 30 mm, a continuous alloy wire 7' cannot be obtained, and the wire diameter becomes nonuniform.

The ejection temperature of the alloy raw material 1 in the molten state is preferably higher than its melting point by about 10° to 100° C. When the ejection temperature is less than 10° C. above the melting point, flowability of the alloy is poor. However, when the ejection temperature is more than 100° C. above the melting point, a continuous alloy wire 7' cannot be prepared.

The alloy wire 7' thus obtained has a substantially circular section and a small, uniform diameter. Furthermore, since the molten alloy is rapidly cooled, a wire having a homogeneous composition can be obtained.

Another embodiment of a method of the present invention wherein a sealing alloy is obtained in a wire or strip form will be described with reference to FIGS. 3 and 4.

As in the case of FIG. 3, a high-frequency coil or electric heater 4 is arranged to surround a container 3 which has a nozzle 2 at its lower end and holds a low-melting point alloy raw material 1 therein. A cooling roll 15 is disposed below the nozzle 2. The cooling roll 15 consists of a material which has a good thermal conductivity, such as copper or iron.

In this apparatus, the alloy raw material 1 is charged in the container 3 and heated by the electric heater 4 to be melted. When the raw material 1 reaches a predetermined temperature, as in the case of FIG. 2, a gas is introduced into the container 3 through an inlet port at an upper portion thereof. The molten raw material 1 in the container 3 is thus continuously ejected from the nozzle 2 and is rapidly cooled by the cooling roll 15. A continuous alloy strip 7'' is thus formed and is taken up on a spool (not shown).

In this embodiment, the nozzle 2 preferably has an inner diameter of 0.2 to 2.0 mm and more preferably an inner diameter of 1 mm. When the inner diameter of the nozzle 2 is less than 0.2 mm, the ejection state is unstable and the surface of the alloy wire 7'' is nonuniform. However, when the inner diameter of the nozzle 2 exceeds 2.0 mm, the molten alloy inadvertently drips from the nozzle 2.

The ejection temperature of the molten alloy raw material 1 is preferably higher than its melting point by about 10° to 100° C., as in the case of FIG. 2. When the ejection temperature is less than 10° C. above the melting point, the flowability of the alloy is poor. However, when the ejection temperature is more than 100° C. above the melting point, satisfactory cooling cannot be performed. Then, a strip of a sufficient thickness cannot be obtained, and the surface state becomes nonuniform.

The rotating speed of the cooling roll 15 is preferably set to be 0.2 to 5.0 m/sec and more preferably 0.2 to 2.0 m/sec in order to obtain a thick strip 7″ having a thickness of 0.1 to 2 mm. In this case, if the rotating speed is less than 0.2 m/sec, the surface state tends to become nonuniform. However, when the rotating speed exceeds 5.0 m/sec, the obtained strip 7″ has a thickness smaller than 0.1 mm. Such a thin strip is difficult to handle as a sealing material. Even if the ejection pressure is increased, in this case, the thickness of the obtained strip 7″ is not significantly increased and only width thereof is increased.

The alloy strip 7″ obtained has a strip-like shape having a thickness of 0.1 to 2 mm. Since the molten alloy is rapidly cooled, a strip of homogeneous composition can be obtained.

Figure 4:
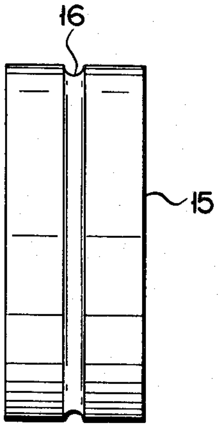
FIG. 4 is a side view of a cooling roll used in the apparatus shown in FIG. 3.

FIG. 4 shows a modification of this embodiment. In this modification, an annular groove 16 is formed along the outer circumferential surface of the cooling roll 15. When an alloy raw material 1 is ejected into this groove 16, an alloy wire 7″ having a substantially square section can be obtained.

The alloy wire 7′ and 7″ obtained in this manner is cut to a predetermined length which is inserted into a fluorescent lamp sealed tube through a thin tube. Therefore, sieving can be omitted, the manufacturing yield is improved, the method is inexpensive, and the workability is improved.

A low melting-point alloy sealed in a fluorescent lamp, particularly, a low-pressure mercury vapor discharge lamp can be prepared by two processes. According to the first process, the alloy is formed and sealed in a sealed tube of the discharge lamp into which mercury is also separately sealed, and the alloy and mercury are alloyed (amalgamated). According to the second process, the alloy is alloyed with Hg and the resultant amalgam is formed into particles or wire to be sealed in the tube.

The first process will first be described wherein particles or wire of a low melting-point alloy is prepared by ejection cooling. The particles or wire is then sealed in a sealed tube together with Hg, which are amalgamated when the tube is in use.

The alloy composition in this case consists of Bi, In and one or both of Sn and Pb. The composition ratio is preferably 15 to 57% by weight of Sn, 5 to 40% by weight of Pb, 30 to 70% by weight of Bi, and 4 to 50% by weight of In.

The alloy composition in the second process consists of Bi, In, and Hg and one or both of Sn and Pb. The composition ratio is preferably 15 to 57% by weight of Sn, 5 to 40% by weight of Pb, 30 to 70% by weight of Bi, 4 to 50% by weight of In, and 4 to 25% by weight of Hg.

The elements Sn, Pb, Bi and In are respectively low melting-point metals and form an amalgam with Hg so as to lower its melting point. When the addition amounts of these metals fall within the prescribed ranges described above, a solid-liquid amalgam can be obtained at a temperature range of 50° to 130° C.

Figure 5:
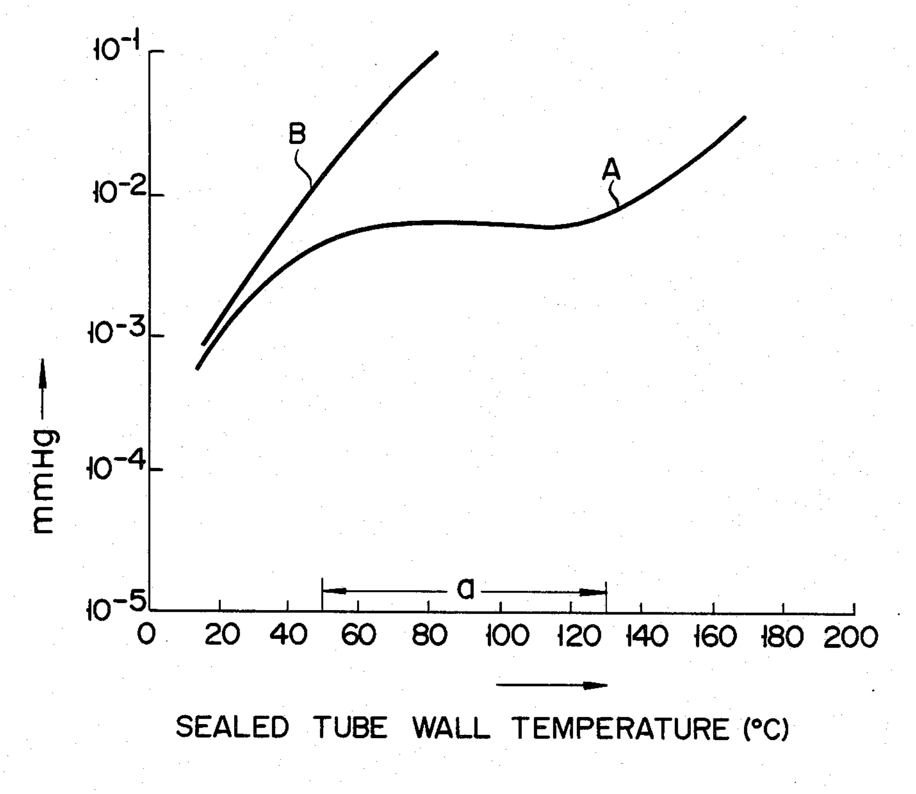
FIG. 5 is a graph showing the relationship between the sealed tube wall temperature and the mercury vapor pressure therein.

FIG. 5 shows a graph showing the relationship between the sealed tube wall temperature and the mercury vapor pressure when the amalgam alloy in the form of particles or wire is sealed in the sealed tube. As can be seen from curve A in FIG. 5, the amalgam alloy of the present invention is converted into a solid-liquid amalgam within a temperature range of 50° to 130° C. In this state, the mercury vapor pressure can be stably held at $6\times10^{-3}$ to $7\times10^{-3}$ mmHg at which a maximum light output can be obtained. In contrast to this, in a lamp wherein only Hg is sealed, a mercury vapor pressure abruptly increases with an increase in temperature and the efficacy is lowered, as can be seen from curve B.

The low melting-point alloy to be used herein is not limited to that having the composition described above but can be other composition. For example, an alloy consisting of 30 to 70% Bi, 4 to 50% In and 2 to 25% Hg can be employed. When this alloy is employed, the solid phase-liquid phase thereof will be shifted to a higher temperature side.

EXAMPLES 1-6

The alloy raw material used consisted of 56% by weight of Bi, 16% by weight of In, 16% by weight of Sn, and 10% by weight of Hg. The raw material was charged in a quartz container 3 of an apparatus shown in FIG. 1 to prepare alloy particles 7. In this case, the nozzle inner diameter, the extrusion pressure, and a distance between a nozzle 2 and a coolant surface level 8 were varied as shown in Table 1 below to prepare alloy particles 7 using water as a coolant 6. The shape and size of the obtained alloy particles 7 were measured.

For the purpose of comparison, alloy particles 7 were also prepared following the same procedures as in these examples but under conditions following outside the prescribed ranges according to the present invention. The results obtained are also shown in Table 1 below.

TABLE 1

| | Nozzle inner diameter (mm) | Extrusion pressure (kg/cm²) | Distance between nozzle and coolant surface level (mm) | Shape and size of alloy particles |
|---|---|---|---|---|
| Example 1 | 0.15 | 0.2 | 10 | Spherical (1.5 to 2 mm diameter) |
| Example 2 | 0.3 | 0.05 | 10 | Spherical (1.5 to 2 mm diameter) |
| Example 3 | 1.0 | 0.01 | 10 | Spherical (1.5 to 2 mm diameter) |
| Example 4 | 0.3 | 0.05 | 2 | Spherical (1.5 to 2 mm diameter) |
| Example 5 | 0.3 | 0.05 | 50 | Spherical (1.5 to 2 mm diameter) |
| Example 6 | 0.3 | 0.05 | 100 | Spherical (1.5 to 2 mm diameter) |
| Comparative Example 1 | 0.3 | 0.3 | 10 | Wire |
| Comparative Example 2 | 0.3 | 0.05 | 200 | Strip |
| Comparative Example 3 | 1.5 | 0.01 | 10 | Spherical (4 mm diameter) |

EXAMPLES 7-12

Two types of alloys were prepared. The first alloy (to be referred to as alloy I hereinafter) consisted of 60% by weight of Bi, 20% by weight of In, and 20% by weight of Sn and had a melting point of about 80° C. The second alloy (to be referred to as alloy II hereinafter) consisted of 48% by weight of Bi, 16% by weight of In, 16% by weight of Sn, and 20% by weight of Hg, and had a melting point of about 60° C. Using the apparatus shown in FIG. 2, the alloys were ejected while the inner diameter of a nozzle 2 and the distance between the nozzle 2 and a coolant surface level 8 were varied, thus preparing alloy wires 7' having a diameter of 0.5 to 1 mm. The states of the obtained wires 7' were examined. The ejection temperature of the alloy I was 120° C., while that of the alloy II was 110° C. Water was used as a coolant 6.

For the purpose of comparison, alloy wires 7' were prepared following the same procedures of these examples but under conditions falling outside the prescribed ranges according to the present invention.

The obtained results are shown in Table 2.

TABLE 2

| | Alloy type | Nozzle inner diameter (mm) | Distance between nozzle and coolant surface level (mm) | Shape and size of alloy wire |
|---|---|---|---|---|
| Example 7 | Alloy I | 0.5 | 10 | Sufficiently long |
| Example 8 | Alloy I | 0.5 | 30 | Sufficiently long |
| Example 9 | Alloy I | 1.0 | 10 | Sufficiently long |
| Example 10 | Alloy I | 2.0 | 10 | Sufficiently long |
| Example 11 | Alloy II | 0.5 | 10 | Sufficiently long |
| Example 12 | Alloy II | 1.0 | 10 | Sufficiently long |
| Comparative Example 4 | Alloy I | 0.5 | 40 | 10 to 20 mm long |
| Comparative Example 5 | Alloy I | 2.5 | 10 | 10 to 20 mm long |
| Comparative Example 6 | Alloy II | 0.2 | 30 | 10 to 20 mm long |
| Comparative Example 7 | Alloy II | 2.5 | 20 | 10 to 20 mm long |

EXAMPLES 13-20

Two types of alloys were prepared. The first alloy consisted of Bi, 20% by weight of In, and 20% by weight of Sn and had a melting point of about 80° C. The second alloy consisted of Bi, 20% by weight of In, 20% by weight of Sn, and 10% by weight of Hg. Using the apparatus shown in FIG. 3, the alloys were ejected onto a cooling roll 15 under the conditions shown in Table 3 while the rotating speed of the cooling roll 15, the ejection temperature and the nozzle diameter were varied and the gas ejection pressure was 0.1 to 0.3 atm, thereby preparing continuous alloy strips. The thickness of the alloy strips obtained was measured, and the obtained results are shown in Table 3 below.

For the purpose of comparison, alloy strips were prepared following the same procedures of these examples but with rotating speeds, ejection temperatures and nozzle diameters which fell outside the prescribed ranges according to the present invention. The obtained results are also shown in Table 3.

TABLE 3

| | Alloy composition (% by weight) | Rotational speed (m/sec) | Injection temperature (°C.) | Nozzle diameter (mm) | Thickness (mm) |
|---|---|---|---|---|---|
| Example 13 | Bi—20% In—20% Sn | 0.2 | 110 | 0.5 | 2.0 |
| Example 14 | Bi—20% In—20% Sn | 1.0 | 110 | 0.5 | 0.5 |
| Example 15 | Bi—20% In—20% Sn | 5.0 | 110 | 0.5 | 0.1 |
| Example 16 | Bi—20% In—20% Sn | 1.0 | 150 | 0.5 | 0.6 |
| Example 17 | Bi—20% In—20% Sn | 1.0 | 180 | 0.5 | 0.5 |
| Example 18 | Bi—20% In—20% Sn—10% Hg | 0.5 | 100 | 0.3 | 1.0 |
| Example 19 | Bi—20% In—20% Sn—10% Hg | 0.5 | 100 | 0.5 | 1.2 |
| Example 20 | Bi—20% In—20% Sn—10% Hg | 0.5 | 100 | 1.0 | 1.5 |
| Comparative Example 8 | Bi—20% In—20% Sn | 0.1 | 110 | 0.5 | Rugged surface |
| Comparative Example 9 | Bi—20% In—20% Sn | 10.0 | 110 | 0.5 | 0.05 |
| Comparative Example 10 | Bi—20% In—20% Sn | 1.0 | 200 | 0.5 | Rugged surface |

According to a method of manufacturing a low melting-point alloy for sealing in a fluorescent lamp of the present invention, particles having a diameter of 1.5 to 2.0 mm or a wire or strip having a diameter or thickness of 0.1 to 2.0 mm can be obtained. Thus, measurement and sealing of the alloy is easy, and the obtained particles or wire or strip have a homogeneous composition due to rapid cooling from the molten state.

What is claimed is:

1. A method of manufacturing an amalgam for sealing in a fluorescent lamp, comprising the steps of:
melting an analgam for sealing in a fluorescent lamp:
ejecting the molten amalgam through a nozzle; and
bringing the discharged molten amalgam into contact with a coolant to rapidly cool the alloy,
wherein said amalgam consists of 15 to 57% by weight of tin, 5 to 40% by weight of lead, 30 to 70% by weight of bismuth, 4 to 50% by weight of indium and 4 to 25% by weight of mercury.

2. A method according to claim 1, wherein the coolant is a liquid, and the molten amalgam is dripped from said nozzle into the liquid so as to form amalgam particles.

3. A method according to claim 2, wherein said nozzle has an inner diameter of 0.15 to 1.0 mm.

4. A method according to claim 2, wherein a distance between said nozzle and a coolant surface level is 2 to 100 mm.

5. A method according to claim 2, wherein an extrusion pressure of the molten amalgam from said nozzle is 0.005 to 0.2 $kg/cm^2$.

6. A method according to claim 2, wherein the coolant is a member selected from the group consisting of water, oil, glycerin, alumina colloid and zirconia colloid.

7. A method according to claim 2, wherein the coolant has a viscosity of more than 1 poise.

8. A method according to claim 1, wherein the coolant is a liquid, and the molten amalgam is continuously ejected into the liquid from said nozzle to form an amalgam strip.

9. A method according to claim 8, wherein said nozzle has an inner diameter of 0.3 to 2.0 mm.

10. A method according to claim 8, wherein a distance between said nozzle and a coolant surface level is not more than 30 mm.

11. A method according to claim 8, wherein the coolant is rotated in one direction while receiving the molten amalgam therein.

12. A method according to claim 8, wherein the coolant is a member selected from the group consisting of water, oil, glycerin, alumina colloid and zirconia colloid.

13. A method according to claim 1, wherein the coolant comprises a rotating body, and the molten amalgam is continuously ejected into a surface of the rotating body so as to cool the amalgam and to form an amalgam strip.

14. A method according to claim 13, wherein said rotating body rotates at a speed of 0.2 to 5.0 m/sec.

15. A method according to claim 13, wherein said nozzle has an inner diameter of 0.2 to 2.0 mm.

16. A method according to claim 13, wherein a temperature of the amalgam which is ejected is higher than a melting point of the amalgam by 10° to 100° C.

17. A medthod according to claim 13, wherein an annular groove is formed in the surface of said rotating body along a circumferential direction thereof.

18. A fluorescent lamp in which an amalgam is sealed, the amalgam having been prepared by the steps of melting the amalgam for sealing in a fluorescent lamp; discharging the molten amalgam from a nozzle; and bringing the discharged molten amalgam into contact with a coolant to rapidly cool the amalgam, wherein said amalgam consists of 15 to 57% by weight of tin, 5 to 40% by weight of lead, 30 to 70% by weight of bismuth, 4 to 50% by weight of indium and 4 to 25% by weight of mercury.

19. A fluorescent lamp according to claim 18, wherein said fluorescent lamp is a low-pressure mercury vapor discharge lamp.

* * * * *